United States Patent

Schöb

[11] Patent Number: 5,808,437
[45] Date of Patent: Sep. 15, 1998

[54] METHOD FOR COMPENSATION OF PERIODIC SHAKING FORCES IN AN ELECTRICAL ROTATING FIELD MACHINE

[75] Inventor: Reto Theodor Schöb, Volketswil, Switzerland

[73] Assignees: Sulzer Electronics AG, Winterthur, Switzerland; Lust Antriebstechnik GmbH, Lahnau, Germany

[21] Appl. No.: 836,493

[22] PCT Filed: Jan. 10, 1995

[86] PCT No.: PCT/IB95/00020

§ 371 Date: May 12, 1997

§ 102(e) Date: May 12, 1997

[87] PCT Pub. No.: WO96/17180

PCT Pub. Date: Jun. 6, 1996

[30] Foreign Application Priority Data

Dec. 2, 1994 [CH] Switzerland .................. 03 649/94

[51] Int. Cl.⁶ .................................................. H02P 7/00
[52] U.S. Cl. ........................ 318/632; 318/807; 318/623
[58] Field of Search ...................... 318/632, 432, 318/138, 128, 460, 114, 433, 623, 629, 611–624, 798–815; 310/51

[56] References Cited

U.S. PATENT DOCUMENTS

| 4,950,966 | 8/1990 | Moulds, III | 318/561 |
| 4,999,534 | 3/1991 | Andrianos | 310/90.5 |
| 5,164,647 | 11/1992 | Moulds, III | 318/561 |
| 5,400,269 | 3/1995 | White et al. | 364/570 |
| 5,465,035 | 11/1995 | Scaramuzzo, Jr. et al. | 318/561 |
| 5,545,957 | 8/1996 | Kubo et al. | 318/432 |
| 5,659,234 | 8/1997 | Cresens | 318/646 |

*Primary Examiner*—Jonathan Wysocki
*Attorney, Agent, or Firm*—Townsend and Townsend and Crew LLP

[57] ABSTRACT

A method for the compensation of periodic shaking forces in an AC-machine having a special winding for the combined generation of a torque and a transverse force. The compensation takes place by a pre-control that acts on the desired force (at the input of the control method) or on the control current, and which is dependent on the flux angle, on the mechanical rotor angle, on the angular velocity of the flux, and on the mechanical angular velocity of the rotor. Additionally, linear and non-linear errors in the control of the transverse force vector such as arise from slot harmonics and winding harmonics and from the material saturation are compensated by a rotation stretching of the control current vector dependent on the flex vector.

13 Claims, 8 Drawing Sheets

METHOD FOR COMPENSATION OF PERIODIC SHAKING FORCES IN AN ELECTRICAL ROTATING FIELD MACHINE

BACKGROUND OF THE INVENTION

1. Field of the Invention

The invention relates to a method for the compensation of periodic shaking forces in an electrical rotating field machine or an AC-machine having a special winding for the combined generation of a torque and a transverse force in the same, wherein the transverse force F acts perpendicular to the rotor and its magnitude and direction can be set as desired, and wherein the stator winding includes a drive winding with the pole pair number $p_1$ and a control winding with the pole pair number $p_2 = p_1 \pm 1$, the control winding is fed with a control current $i_{s2}$ independently of the drive current $i_{s1}$ of the drive winding, the argument of the drive flux $\gamma_s^{(p1)}$ represented in the $p_1$ plane is determined, the control current $i_{s2}^{*(T,p2)}$ considered in the $p_2$ plane necessary for a desired transverse force F* is determined in a coordinate system (T) rotating with the angle $\gamma_s^{(p1)}$, this control current $i_{s2}^{*(T,p2)}$ is transformed by a coordinate rotation through the angle $\rho^{(p2)} = \rho_0^{(p2)} = \gamma_s^{(p1)}$ into a coordinate system (S) fixed relative to the stator, with any relative rotation of the control winding and of the drive winding in the stator being taken into account by the constant angle $\rho_0^{(p2)}$.

2. Description of the Prior Art

A method for the independent control of the torque and of a transverse force F acting on the rotor in a rotary field machine with a $p_1$ pole-paired winding and a ($p_2 = p_1 \pm 1$) pole-paired winding is described in the Swiss patent application No. 00 056/94-7. This control method takes account of all the transverse forces arising in an idealized machine (without taking account of the slot harmonics and the winding harmonics, of geometrical and electrical asymmetries in the flux circuit, of the anisotropy of the magnetic tension force, of the material saturation, and also of the imbalance forces acting on the rotor) and permits the precise control of the transverse force vector for each operating state of an idealized machine.

In the operation of a real machine, deviations arise as a result of the above named non-ideal characteristics of the machine between the desired transverse force and the real transverse force acting on the rotor. In particular, periodic shaking forces act on the rotor which have their origin in the above named non-ideal characteristics of the machine, which has proved disadvantageous with the control methods known hitherto.

SUMMARY OF THE INVENTION

It is thus the object of the invention to compensate for the deviations between the desired transverse force and the real transverse force acting on the rotor, in particular to compensate for the periodically occurring shaking forces, through additional control interventions and thus to avoid the disadvantages of the prior art.

The above named periodic shaking forces are compensated by a pre-control which acts on the desired force (at the input of the control method) or on the control current, and which is dependent on the flux, angle, on the mechanical rotor angle, on the angular velocity of the flux and on the mechanical angular velocity of the rotor. Moreover, linear and non-linear errors in the control of the transverse force vector such as arise from slot harmonics and winding harmonics and from the material saturation are compensated by a rotation stretching of the control current vector dependent on the flux vector.

Accordingly, periodic, and thus predictable, "disturbing forces" inherent to the system are compensated for by the superposition of corresponding magnetic forces acting in the opposite direction. The superimposing of the correction signal can take place at the force control input of the control current calculation block as a pre-control force, at the output of the current control computation block as a pre-control current in stator coordinates, or within the current control calculation block, prior to the rotational transformation, as a pre-control current in the coordinate system which rotates with the drive flux.

Since the periodic shaking forces can have various causes, a part of these shaking forces is periodically linked with the geometrical drive flux angle, and another part is periodically linked with the mechanical rotor angle. If the geometrical drive flux angle is, on the one hand, rigidly coupled to the mechanical rotor angle, which is the case for synchronous machines (which also includes reluctance and stepping motors), then the periodicities of the previously named shaking force components coincide. They can thus be jointly corrected by a single pre-control signal linked to the mechanical rotor angle, or to the (at most phase-displaced) geometrical drive flux angle. If the geometrical drive flux angle is, however, not rigidly coupled to the mechanical rotor angle, which is the case for induction machines, then the shaking forces linked to the geometrical drive flux angle and the shaking forces linked to the mechnical rotor angle must be compensated by separate pre-control signals.

It would also be conceivable to determine the periodic shaking forces by computation on the basis of the deviations of a model for the transverse force formation formed from the ideal model described in the Swiss patent application No. 00 056/94-7 supplemented by the named non-ideal characteristics, and to subsequently determine the pre-control signals necessary for the compensation of these shaking forces. This is however only possible with non-ideal characteristics which are known (slotting, winding harmonics, eventual material saturation). Many non-ideal characteristics such as geometrical or electrical asymmetries or imbalance are, in contrast, brought about by manufacturing tolerances and are thus not known in advance.

The idea of determining the shaking forces in a measurement run individually for each transverse force motor by direct measurement, or from other measurement parameters, for example from the rotor position, corresponds to a further development of the inventive concept. Since a part of the shaking forces (for example imbalance forces) is dependent on the speed of rotation, it is necessary to carry out the measurements for various speeds of rotation. In the same way, it is necessary with a variable drive flux (for example during operation in the field weakening region) to carry out the measurements for different drive flux magnitudes. By an averaging process over several rotations, it is possible to filter out from the measurement signal all disturbances which are not correlated with the measurement angle. A part of the shaking forces is non-speed dependent. In the event that a transverse force regulator or a position regulator with an integral component is superimposed on the machine, the regulator signals can be recorded in a measurement run at very low angular velocity of the drive flux for one rotation, or averaged over several rotations as a function of the geometrical drive flux angle, and can subsequently be used in operation as the pre-control signal.

BRIEF DESCRIPTION OF THE DRAWINGS

(The reference numerals used and their meaning are collectively listed in the reference numeral list. In the drawings the same parts are fundamentally provided with the same reference numerals.)

DETAILED DESCRIPTION OF THE PREFERRED EXEMPLARY EMBODIMENT

As already described above, a method for the independent control of the torque and of a transverse force acting on the rotor in a rotary field machine with a $p_1$ pole-paired winding and a ($p_2=p_1\pm1$) pole-paired winding is disclosed in the Swiss patent application No. 00 056/94-7.

Figure 1:
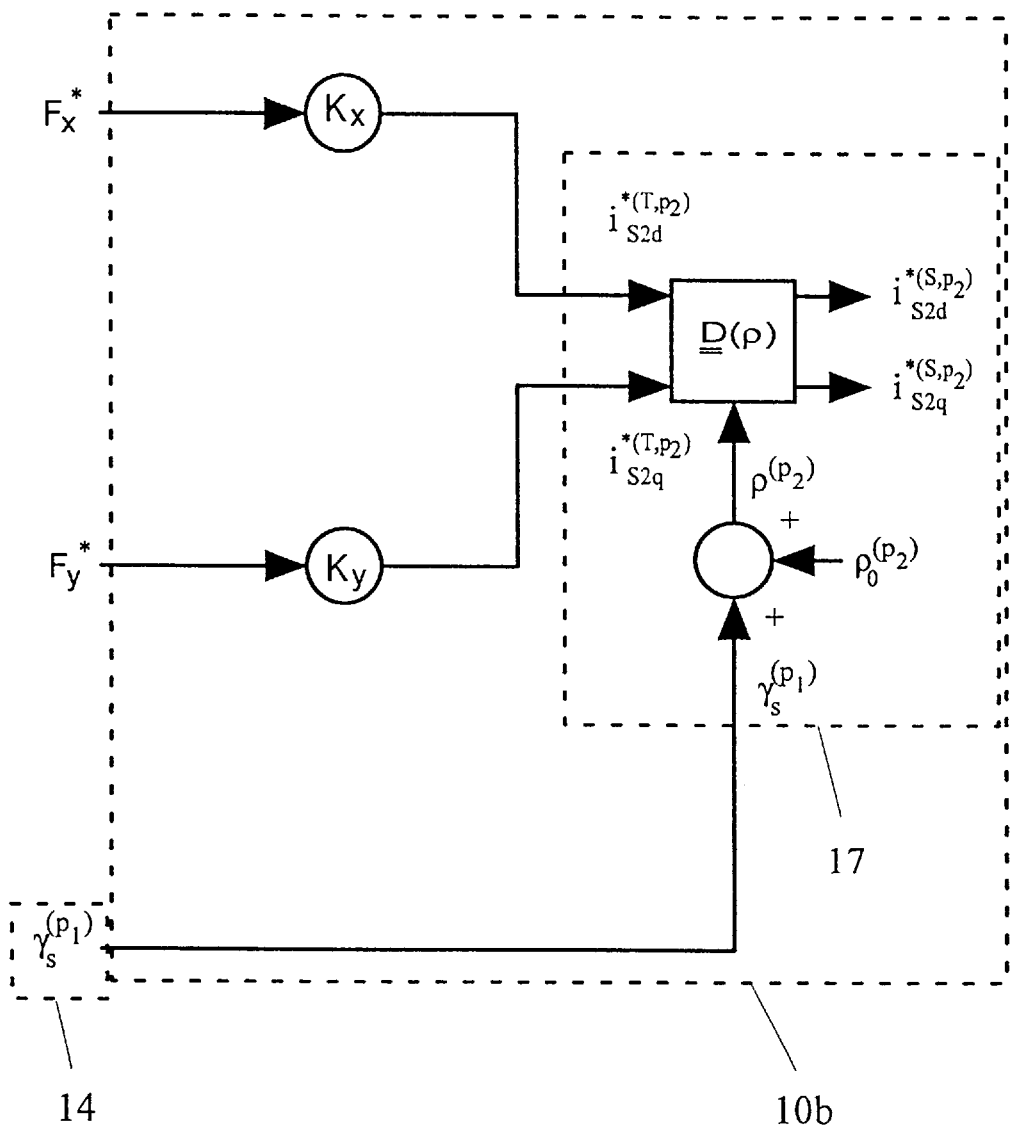
FIG. 1 the signal flux plan of the core of a method described in the Swiss patent application No. 00 056/94-7 for the independent control of the torque and of a transverse force acting on the rotor in a rotary field machine with a $p_1$ pole-paired winding and a ($p_2=p_1\pm1$) pole-paired winding. The case illustrated here is the simplest case (constant flux magnitude without taking account of the disturbing Lorentz forces) in which the control current $\underline{i}_{S2}^{*(T,P2)}$ is directly proportional to the desired force vector $\underline{F}^*$.

The core of this control method is shown in FIG. 1. In a first step the control current necessary for the desired force effect, which is illustrated in the drawing by the vector components $i_{S2d}^{*(T,P2)}$ and $i_{S2q}^{*(T,P2)}$, is determined in a coordinate system (T) which rotates with the flux vector and is additionally turned through a fixed angle. In a second step the so-calculated desired vector of the control current is transformed (17) by rotation through the angle $\rho^{(P2)}$ into the stator coordinate system. The transformation angle $\rho^{(P2)}=\rho_0^{(P2)}+\gamma_s^{(P1)}$ is continually formed from the argument of the flux vector $\gamma_s^{(P1)}$ measured in the $p_1$ plane in the stator coordinate system and from a fixed angle of rotation $\rho_0^{(P2)}$ which takes into account of the mutual rotation of the two winding systems relative to one another and relative to the geometrical axis. The constant component of the rotary angle $\rho_0^{(P2)}$ is defined by the relationship $$\rho_0^{(P2)} = \alpha_0 + \frac{p_2}{p_1}\alpha_{1,2}$$

in which $\alpha_0$ corresponds to any mutual rotation of the d-axis of the drive winding relative to the x-axis of the geometrical coordinate system and $\alpha_{1,2}$ corresponds to any mutual rotation of the d-axes of the drive and control windings relative to one another. The determination of the control current in the coordinate system (T) as a result of the desired transverse force is conceivable in many ways. Various ways for deriving the control currents in the coordinate system (T) (constant flux magnitude without taking account of the disturbing Lorentz forces, variable flux magnitude without taking account of the disturbing Lorentz forces, and variable flux magnitude with the disturbing Lorentz forces being taken into account) are illustrated in the main patent. The control method is based on an ideal machine. The preconditions for this are sinusoidal drive flux distribution and control flux distribution, constant permeability of the iron, geometrical and electrical symmetry in the flux circuit, isotropy of the magnetic tension force, and no imbalance forces. In the real machine the following deviations arise from the ideal model: slot and winding harmonics, geometrical and electrical asymmetries in the flux circuit, an anisotropy of the magnetic tension force with a deflection of the rotor away from the center, material saturation, and imbalance. These non-ideal characteristics of the machine lead to differences between the desired transverse force and the real transverse force acting on the rotor, and in particular to periodic shaking forces. These shaking forces are to be compensated in the control method by the feeding in of correction signals which are likewise periodic.

Figure 2:
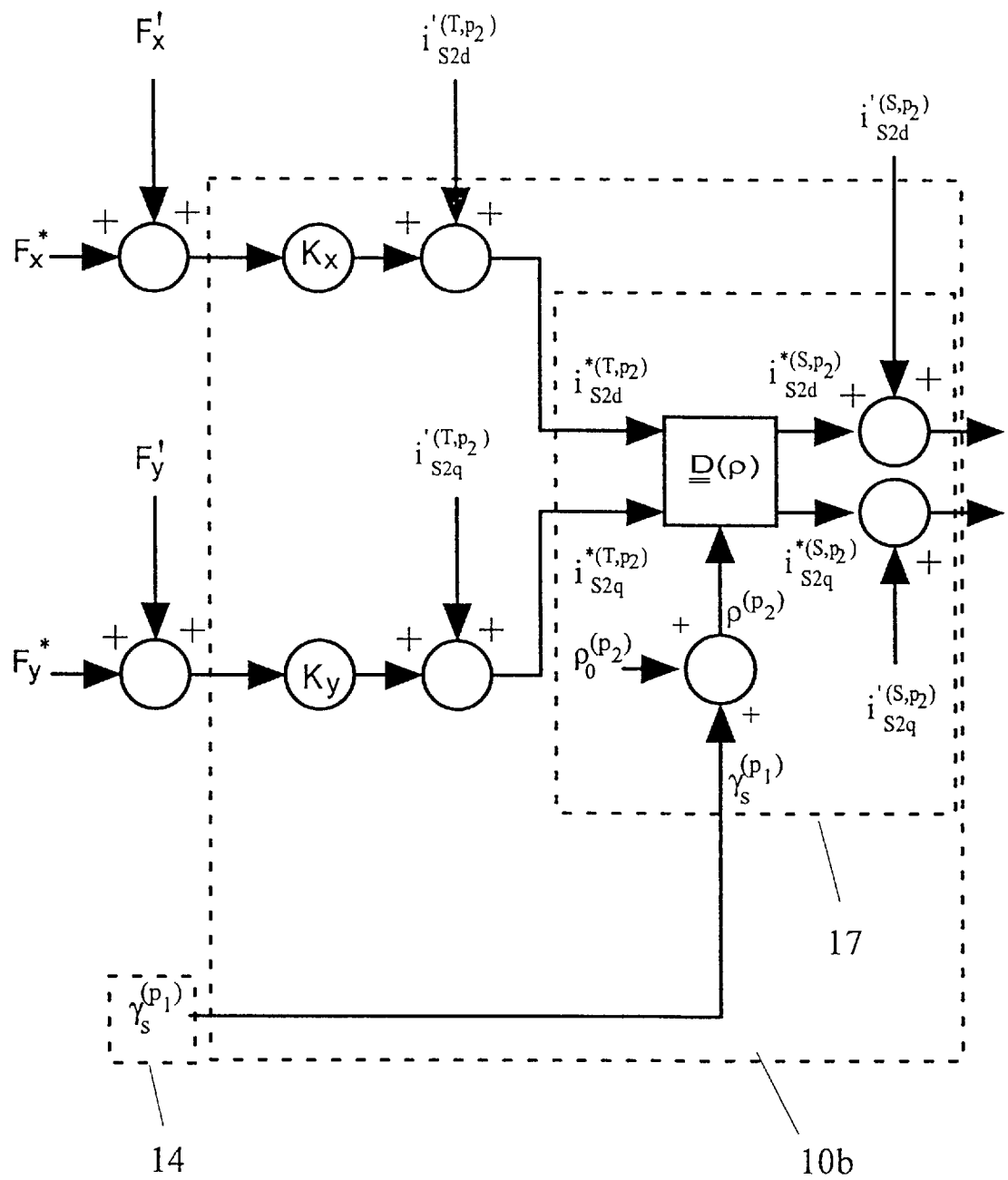
FIG. 2 illustrates the possible feeding in points for pre-control signals for the compensation of periodic shaking forces in the signal flow plan of the control method.

As shown in FIG. 2 the feeding in of the correction signals can take place at the following points: at the force control input ($\underline{F}^*$ with the components $F_x^*$ and $F_y^*$) of the control current calculation block (10) as a pre-control force $\underline{F}'$ with the vector components $F_x'$ and $F_y'$, at the output of the control current calculation block (10) as a pre-control current $\underline{i}_{S2}^{'(S,P2)}$ with the vector components $i_{S2d}^{'(S,P2)}$ and $i_{S2q}^{'(S,P2)}$ in stator coordinates, or within the current control calculation block (10) prior to the rotary transformation as a pre-control current $\underline{i}_{S2}^{'(T,P2)}$ with the vector components $i_{S2d}^{'(T,P2)}$ and $i_{S2q}^{'(T,P2)}$ in the coordinate system (T) rotating with the drive flux.

Depending on the causes, the shaking forces are linked with the drive flux angle or with a multiple of it, or with the mechanical rotor angle. The former include all forces which arise as a result of non-ideal characteristics in the drive and control flux distribution. The causes of this are in particular slot harmonics and winding harmonics with pairings of the form (p+k)±1 (see in this connection "The Windings of Electrical Machines" by Th. Bödefeld and H. Sequenz, Springer-Verlag Wien, 1962), geometrical and electrical asymmetries, field distortions as a result of the material saturation, and the anisotropy of the magnetic tension force in the case of a displacement of the rotor away from the center, which is particularly large for the case of a two-poled drive flux distribution (see in this respect "Finite Element Analysis of the Magnetic Forces Acting on an Eccentric Rotor of a High-Speed Induction Motor" by A. Arkkio and O. Lindgren, Proceedings of the Fourth International Symposium on Magnetic Bearings, ETH Zürich, August 1994). The second category includes, above all, imbalance forces.

If the geometrical drive flux angle is rigidly coupled to the mechanical rotor angle, which is the case for synchronous machines (which also includes reluctance and stepping motors), then the periodicity of the shaking force components coincides. They can thus be jointly corrected by a single pre-control signal linked to the mechanical rotor angle or to the (at most phase-displaced) geometrical drive flux angle.

Figure 3:
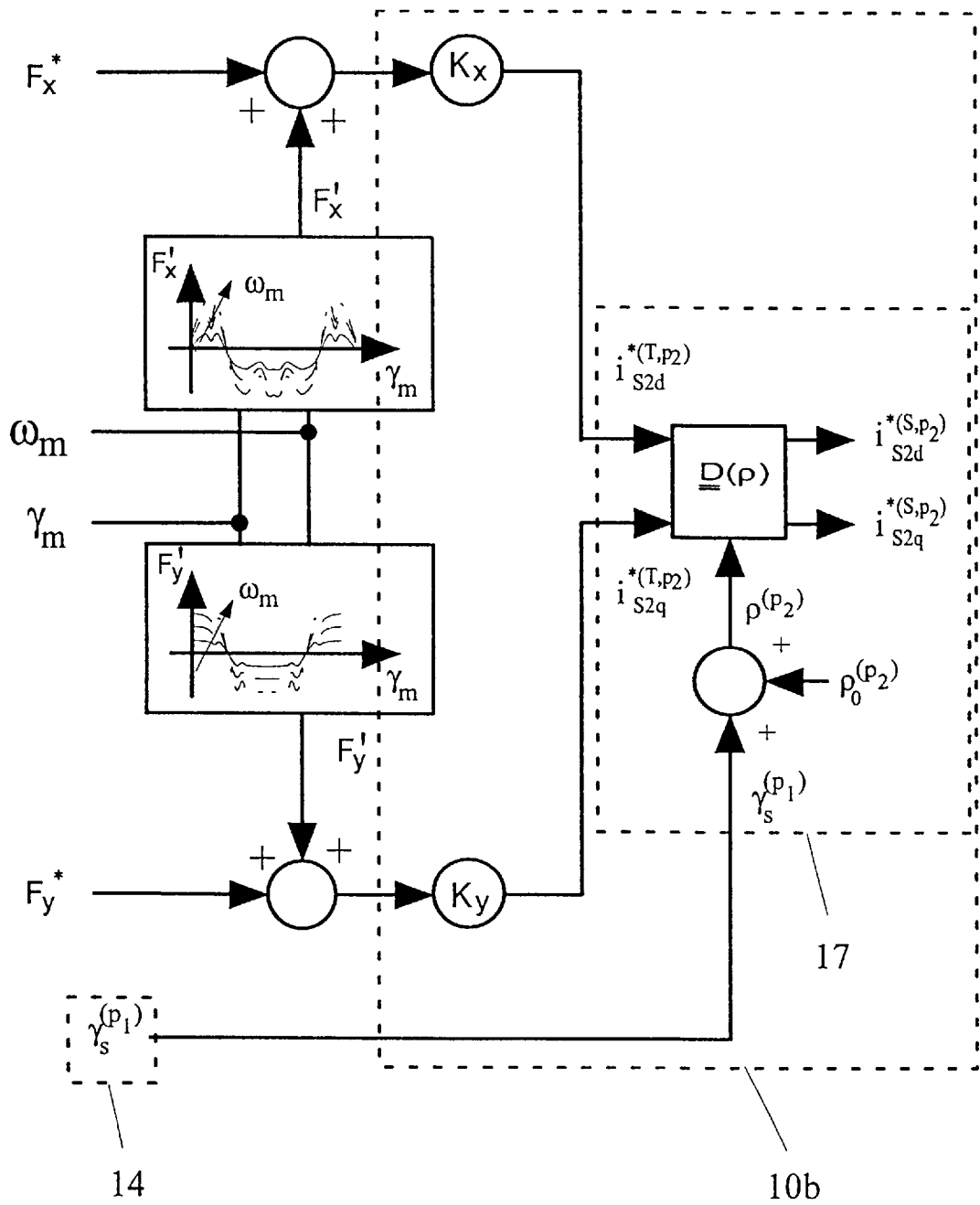
FIG. 3 illustrates pre-control at the force control input ($\underline{F}^*$) with the pre-control force $\underline{F}'$ when geometrical drive flux angle is rigidly coupled to the mechanical rotor angle (synchronous machine)
Figure 4:
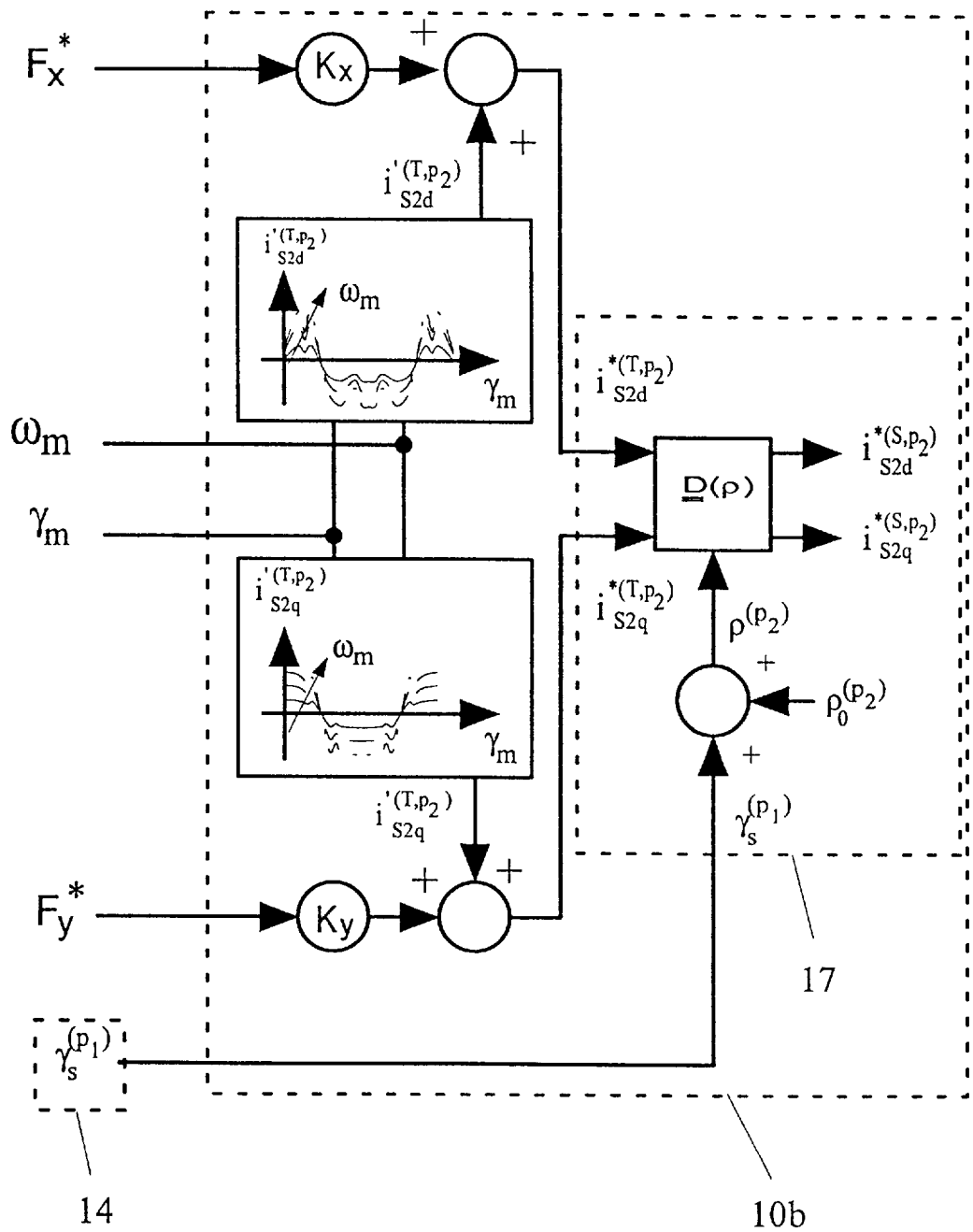
FIG. 4 illustrates pre-control of the control current $\underline{i}_{S2}^{*(T,P2)}$ with the pre-control current $\underline{i}_{S2}^{'(T,P2)}$ in the coordinate system (T) rotating with the drive flux when the geometrical drive flux angle is rigidly coupled to the mechanical rotor angle (synchronous machine)
Figure 5:
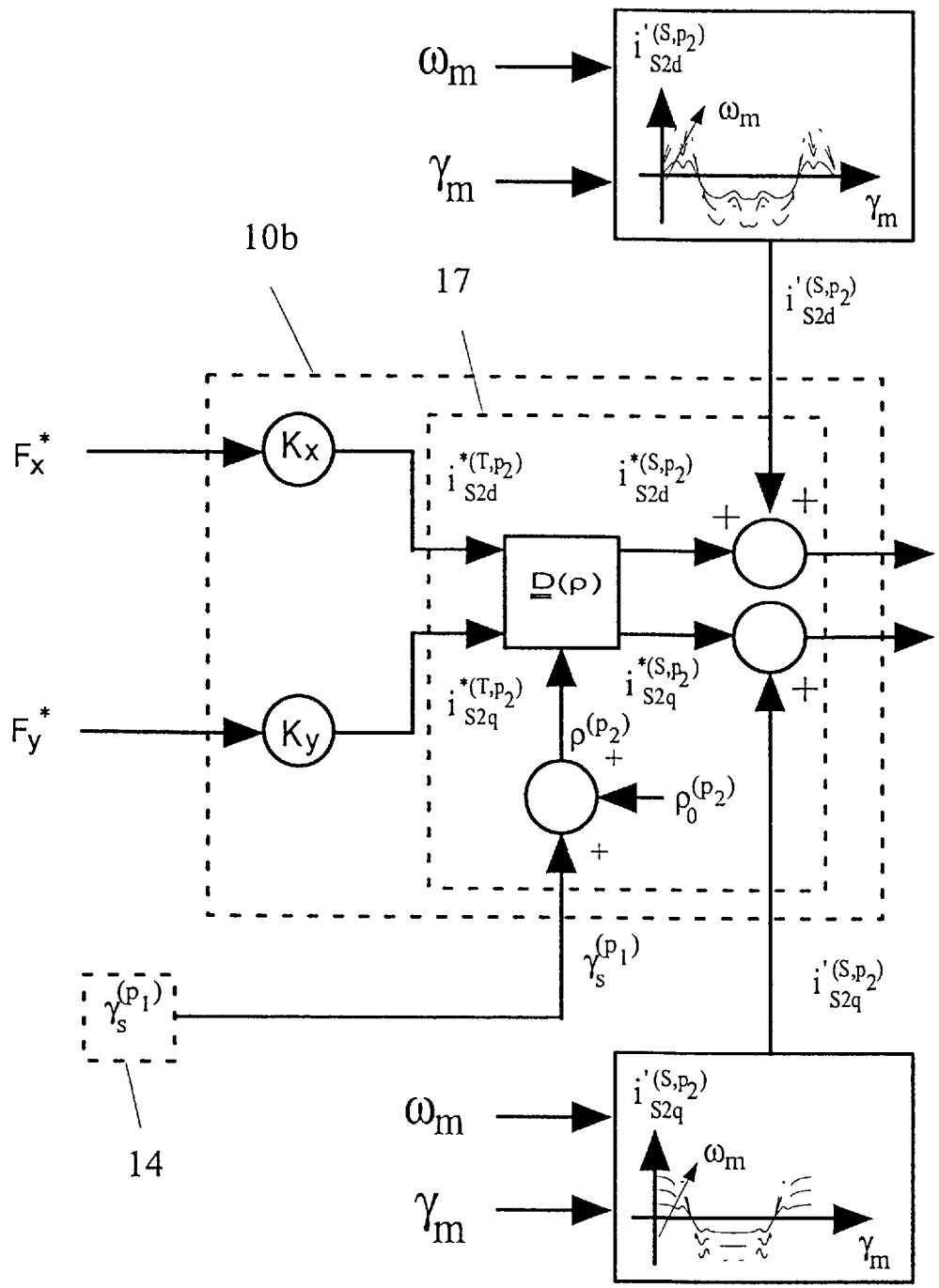
FIG. 5 illustrates pre-control of the control current $\underline{i}_{S2}^{*(S,P2)}$ with the pre-control current $\underline{i}_{S2}^{'(S,P2)}$ in the stator coordinate system (S) when the geometrical drive flux angle is rigidly coupled to the mechanical rotor angle (synchronous machine)

The signal flux diagram for such a compensation is illustrated in FIG. 3 for a pre-control at the control force input ($\underline{F}^*$) using the pre-control force $\underline{F}'$, in FIG. 4 for a pre-control of the control corrent $\underline{i}_{S2}^{*(T,P2)}$ in the coordinate system (T) rotating with the drive flux using the pre-control current $\underline{i}_{S2}^{\prime(T,P2)}$, and in FIG. 5 for a pre-control of the control current $\underline{i}_{S2}^{*(S,P2)}$ in the stator coordinate system (S) using the pre-control current $\underline{i}_{S2}^{\prime(S,P2)}$. Since the shaking forces vary with the speed of rotation, the pre-control signals must likewise be matched to the speed of rotation. The pre-control force and the pre-control currents are thus in the above named case functions of the mechanical rotor angle and of the mechanical angular frequency of the rotor. The following equations apply:

$$\underline{F}' = \begin{pmatrix} F'_x \\ F'_y \end{pmatrix} \text{ with } F'_x = f(\gamma_m, \omega_m) \text{ and } F'_y =$$

$$f(\gamma_m, \omega_m), \underline{i}_{S2}^{\prime(T,P2)} = \begin{pmatrix} i_{S2d}^{\prime(T,P2)} \\ i_{S2q}^{\prime(T,P2)} \end{pmatrix} \text{ with } i_{S2d}^{\prime(T,P2)} = f(\gamma_m, \omega_m) \text{ and}$$

$$i_{S2q}^{\prime(T,P2)} = f(\gamma_m, \omega_m) \text{ and } \underline{i}_{S2}^{\prime(S,P2)} = \begin{pmatrix} i_{S2d}^{\prime(S,P2)} \\ i_{S2q}^{\prime(S,P2)} \end{pmatrix} \text{ with } i_{S2d}^{\prime(S,P2)} =$$

$$f(\gamma_m, \omega_m) \text{ and } i_{S2q}^{\prime(S,P2)} = f(\gamma_m, \omega_m).$$

Figure 6:
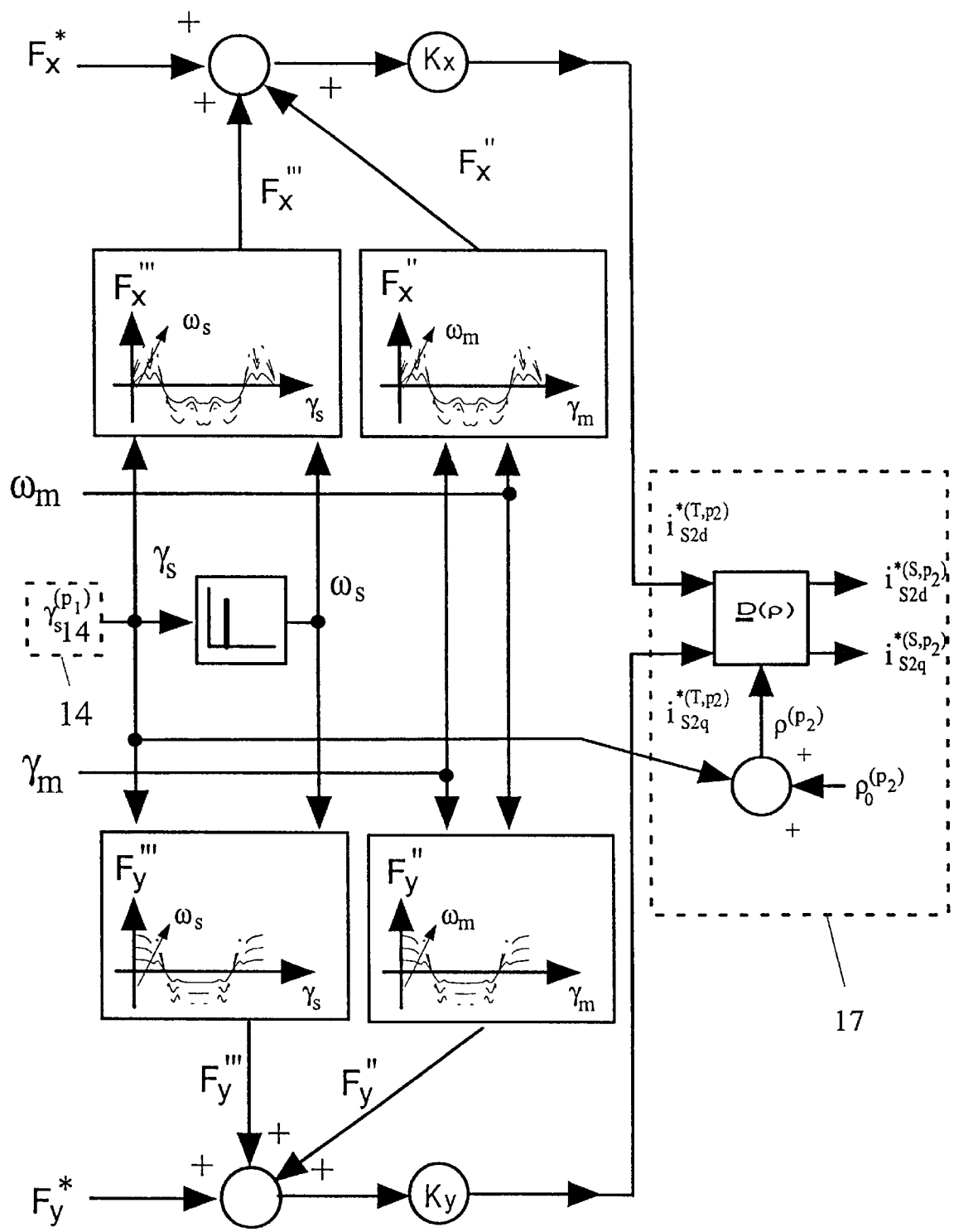
FIG. 6 illustrates pre-control at the control force input ($\underline{F}^*$) with the pre-control force $\underline{F}'''$ coupled to the geometrical drive flux angle and the pre-control force $\underline{F}''$ coupled to the mechanical rotor angle when the geometrical drive flux angle is not rigidly coupled to the mechanical rotor angle (induction machine)
Figure 7:
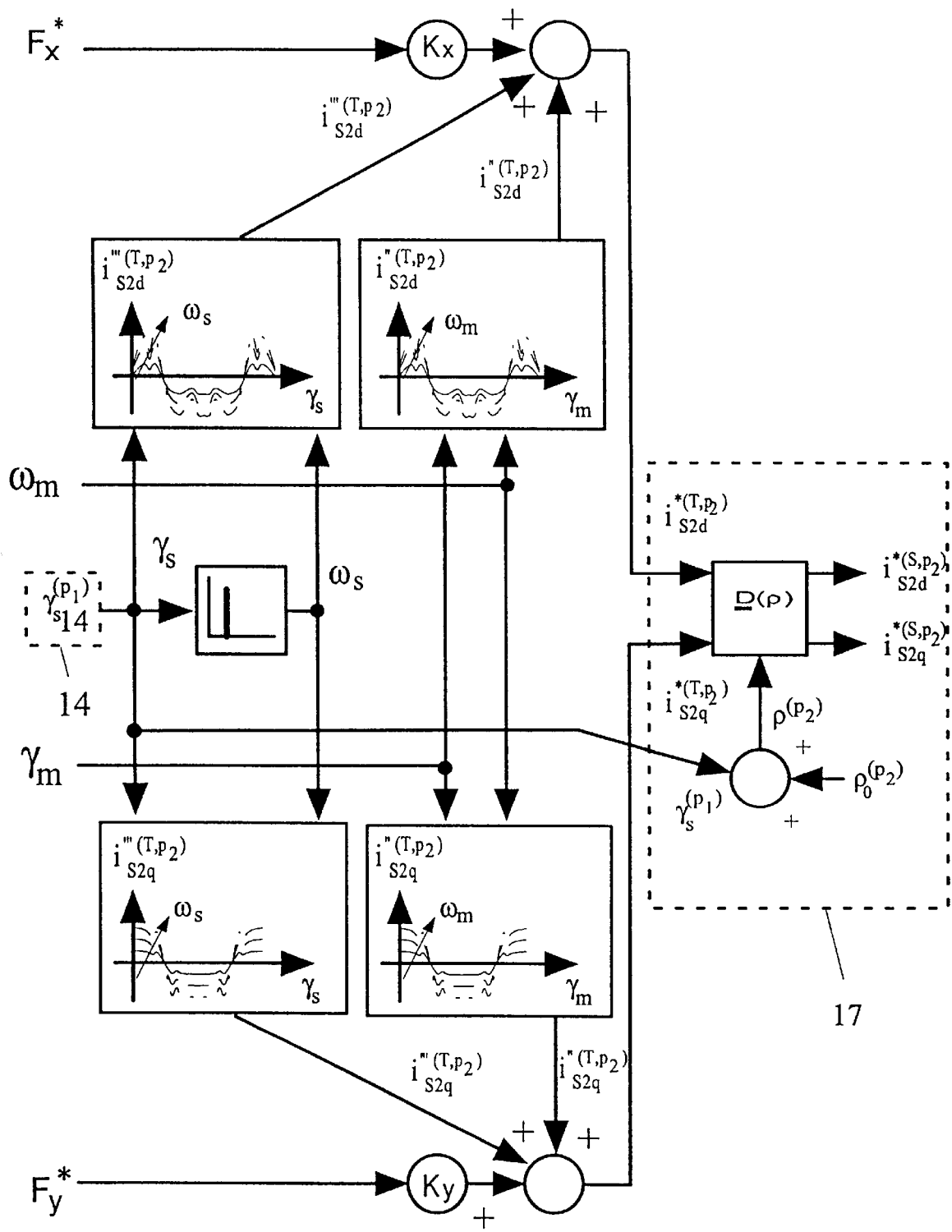
FIG. 7 illustrates pre-control of the control current $\underline{i}_{S2}^{*(T,P2)}$ in the coordinate system (T) rotating with the drive flux using the pre-control current $\underline{i}_{S2}^{'''(T,P2)}$ coupled to the geometrical drive flux angle and with the pre-control current $\underline{i}_{S2}^{''(T,P2)}$ coupled to the mechanical rotor angle when the geometrical drive flux angle is not rigidly coupled to the mechanical rotor angle (induction machine)
Figure 8:
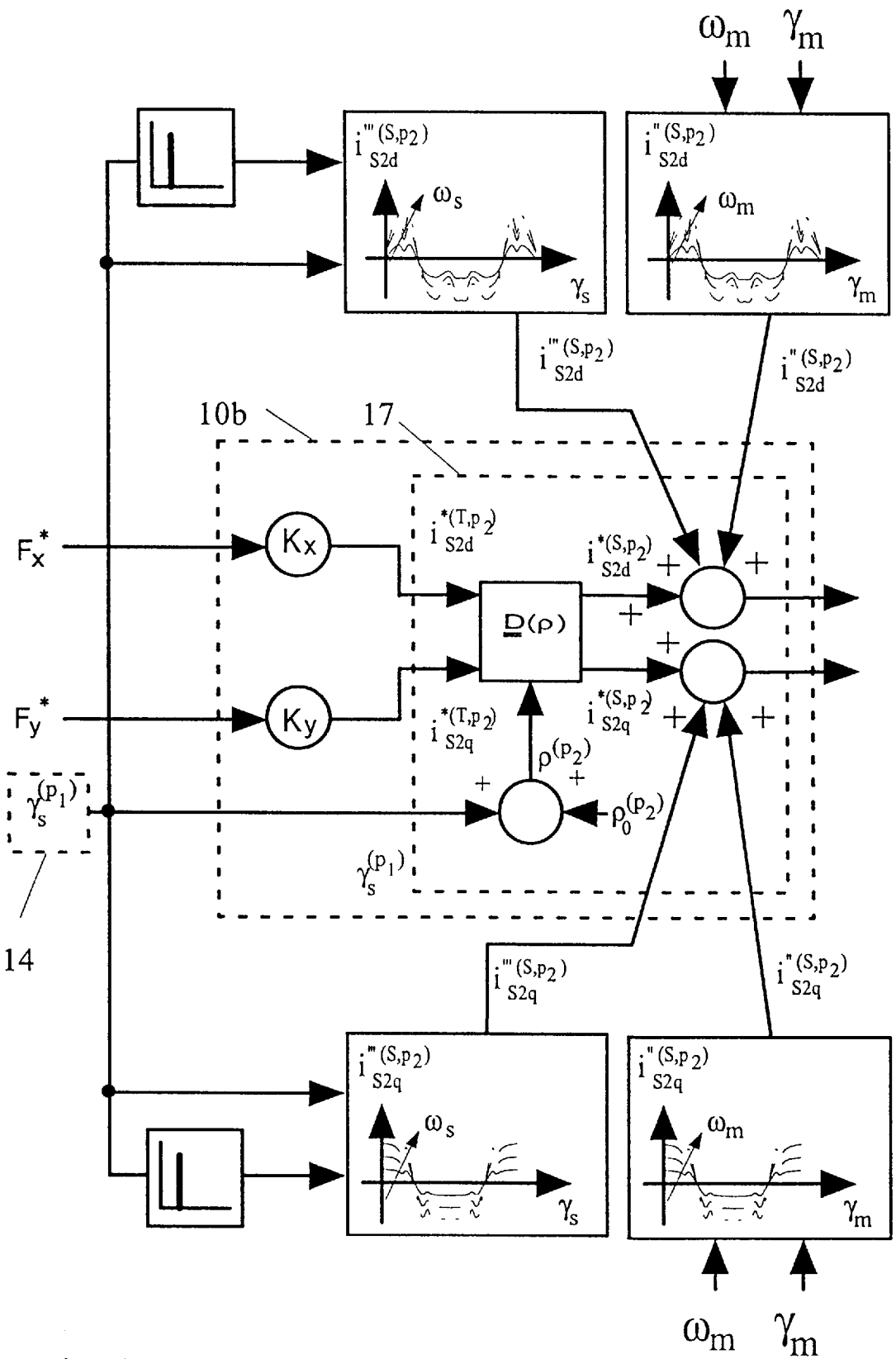
FIG. 8 illustrates pre-control of the control current $\underline{i}_{S2}^{*(S,P2)}$ in the stator coordinate system (S) with the pre-control current $\underline{i}_{S2}^{'''(S,P2)}$ coupled to the geometrical drive flux angle and with the pre-control current $\underline{i}_{S2}^{''(S,P2)}$ coupled to the mechanical rotor angle when the geometrical drive flux angle is not rigidly coupled to the mechanical rotor angle (induction machine).

If the geometrical drive flux angle is not rigidly coupled to the mechanical rotor angle, which is the case for induction machines, then the shaking forces linked to the geometrical drive flux angle and the shaking forces linked to the mechanical rotor angle must be compensated by separate pre-control signals. The signal flux diagram for such compensation is shown in FIG. 6 for a pre-control at the control force input ($\underline{F}^*$). Both a pre-control force $$\underline{F}^{\prime\prime\prime} = \begin{pmatrix} F_x^{\prime\prime\prime} \\ F_y^{\prime\prime\prime} \end{pmatrix}$$

with the vector components $F_x^{\prime\prime\prime}=f(\gamma_s,\omega_s)$ and $F_y^{\prime\prime\prime}=f(\gamma_s,\omega_s)$ coupled to the geometrical drive flux angle and also a pre-control force $$\underline{F}^{\prime\prime} = \begin{pmatrix} F_x^{\prime\prime} \\ F_y^{\prime\prime} \end{pmatrix}$$

with the vector components $F_x^{\prime\prime}=f(\gamma_m,\omega_m)$ and $F_y^{\prime\prime}=f(\gamma_m,\omega_m)$ coupled to the mechanical rotor angle are necessary to compensate shaking forces of different origins. FIG. 7 shows the same case for a pre-control of the control current $\underline{i}_{S2}^{*(T,P2)}$ in the coordinate system (T) rotating with the drive flux. In this case a pre-control current $$\underline{i}_{S2}^{\prime\prime(T,P2)} = \begin{pmatrix} i_{S2d}^{\prime\prime(T,P2)} \\ i_{S2q}^{\prime\prime(T,P2)} \end{pmatrix}$$

with the vector components $i_{S2d}^{\prime\prime(T,P2)}=f(\gamma_m,\omega_m)$ and $i_{S2q}^{\prime\prime(T,P2)}=f(\gamma_m,\omega_m)$ dependent on the mechanical rotor angle and on the angle or speed of the rotor is superimposed in order to compensate for the shaking forces linked to the mechanical rotor angle, and a pre-control current $$\underline{i}_{S2}^{\prime\prime\prime(T,P2)} = \begin{pmatrix} i_{S2d}^{\prime\prime\prime(T,P2)} \\ i_{S2q}^{\prime\prime\prime(T,P2)} \end{pmatrix}$$

with the vector components $i_{S2d}^{\prime\prime\prime(T,P2)}=f(\gamma_s,\omega_s)$ and $i_{S2q}^{\prime\prime\prime(T,P2)}=f(\gamma_s,\omega_s)$ dependent on the geometrical drive flux angle and the angular velocity of the drive flux is superimposed in order to compensate for periodic shaking forces linked to the geometrical drive flux angle. FIG. 8 shows the case of a pre-control of the control current $\underline{i}_{S2}^{*(S,P2)}$ in the stator coordinate system (S). It is carried out analogously to the above named compensation in the stator coordinate system (S) instead of in the coordinate system (T) rotating with the drive flux.

The main problem in the realization of the described compensation of periodic shaking forces now resides in finding out the pre-control signals which are necessary for this purpose. With precise knowledge of all non-ideal characteristics which lead to the shaking forces it would, in principle, be conceivable to derive these by calculation. Unfortunately, many of the above named non-ideal characteristics are not known in advance. Instead of determining these non-ideal features for each transverse force motor individually (by technical measurement) it is simpler to find out the shaking forces directly. This is in any event possible by direct measurement of the forces acting on the rotor (via a bearing) in a measurement rig. It is naturally much simpler in applications in which sensors are present in the system for a transverse force regulation system. Applications with a rotor position regulating system are however to be expected more frequently than, for example, all applications of the bearingless electric motor with a free-floating, position regulated rotor. Here it is possible to determine the shaking forces on the basis of the bearing stiffness set by the technical regulation and on the basis of the rotor deflection. Since a part of the shaking forces (for example imbalance forces) is dependent on the speed of rotation, it is necessary to carry out the measurements for various speeds of rotation. All disturbances which are not correlated with the measurement angle can be filtered out from the measurement signal by averaging over several rotations. Through this measure it is also possible to separate, for the case of induction machines, the shaking forces linked to the mechanical rotor angle from the shaking forces which are linked with the drive flux angle. Since the mechanical angular frequency of the rotor and the angular frequency of the drive flux lie very close to one another in the induction machine, an averaging process carried out over very many rotations is necessary in order to obtain a good separation. In practice several thousand rotations are necessary for one speed of rotation. In this way the measurement run can be very time-consuming. Since the shaking forces linked to the mechanical rotor angle are dominated by an imbalance force rotating with the mechanical rotor frequency, it is possible to separate this imbalance force from the shaking forces linked to the drive flux angle by a narrow band filter matched to the mechanical rotor frequency. The shaking forces determined by the above named methods are stored as supporting values of a two, dimensional function table in a memory chip (as a function of the mechanical rotor angle and of the mechanical angular velocity of the rotor or as a function of the drive flux angle and of the angular velocity of the drive flux). All non-volatile memories into which information can be written such as NOVRAMs, EPROMs, in particular flash EPROMs, and EEPROMs are suitable for this purpose. In order to keep the memory capacity required for this small, on the one hand, and to restrict the time requirement for the measurement run, on the other hand, only a restricted number of supporting values are stored. In practice 128 angle values at ca. 10 different angular velocities, i.e. 2560 supporting values are sufficient (for the illustration of both vector components) for the case of the synchronous machine and 5120 supporting values for the case of the induction machine.

At the time of execution the actual drive flux angle, the angular velocity of the drive flux, the mechanical rotor angle, and the angular velocity of the rotor must always be known. In dependence on these parameters the supporting values of the two closest speeds are then read out for each angle value. The actual value of the shaking force vector (separated in dependence on the drive flux angle and on the mechanical rotor angle) is then found componentwise by interpolation between the supporting values. With knowledge of the shaking force vector (separated in dependence on the drive flux angle and on the mechanical rotor angle) the pre-control signals necessary for the compensation are then calculated. For the case of the force pre-control the shaking force vector (separated in dependence on the drive flux angle and on the mechanical rotor angle) can be directly negatively superimposed on the desired force value. For the case of the current pre-control in the rotating coordinate system (T), a multiplication with a constant factor is additionally necessary with a constant magnitude of the drive flux. For the case of the current pre-control in the coordinate system (S) fixed relative to the stator, a rotary transformation from the coordinate system (T) into the coordinate system (S) is additionally necessary. As a result of this additional complexity this variant makes little sense in practice. It is better here to carry out the calculation of the pre-control currents $\underline{i}_{S2}^{'(S,P2)}(\gamma_m,\omega_m)$ and $\underline{i}_{S2}^{'''(S,P2)}(\gamma_s,\omega_s)$ and $\underline{i}_{S2}^{''(S,P2)}(\gamma_m,\omega_m)$, respectively, from the corresponding shaking forces off-line, during or following the measurement run, and to store these pre-control currents by supporting values in table form. At the time of execution (in operation) the pre-control currents are then determined directly by interpolation between two supporting values from the table with knowledge of the actual mechanical rotor angle and of the angular velocity of the rotor (for the case of synchronous machine) and with additional knowledge of the drive flux angle and of the angular velocity of the drive flux (in the case of the induction machine). Analogously, an off-line calculation is also possible for the current pre-control in the rotating coordinate system (T) and for a force pre-control.

In the previous explanations it is assumed that the magnitude ψ of the drive flux is constant. This assumption is permissible for many practical applications since the magnitude of the drive flux is regulated in accordance with the method described in the main patent (patent application No. 00 056/94-7) and this regulation frequently succeeds to a constant value. If, however, the flux magnitude is varied, (for example in field weakening operation) then this has an effect in particular on the component of the shaking forces coupled to the drive flux angle. This influence must likewise be taken into account in the force pre-control. As the component of the shaking forces coupled to the drive flux angle changes almost proportionally to the drive flux magnitude, a good adaptation is already achieved when the force pre-control signal coupled to the drive flux angle is stretched in direct proportion to the drive flux magnitude. No adaptation to the change of the drive flux is necessary for a current pre-control.

A better adaptation of the pre-control signals to the change of the drive flux is achieved by matching the stretching factor as a function of the drive flux magnitude. The corresponding function is determined in the measurement run and is represented in a table with the aid of supporting positions. The parameter ψ is thereby only varied at the nominal speed of rotation and at precisely one angular value. An even better adaptation of the pre-control signals to the change of the drive flux can be achieved when the magnitude of the drive flux ψ is introduced as an additional parameter into a three-dimensional pre-control function ($\underline{F}'''(\gamma_s,\Psi,\omega_s)$, $\underline{i}_{T2}'''^{(T,P2)}(\gamma_s,\Psi,\omega_s)$ and $\underline{i}_{S2}'''^{(S,P2)}(\gamma_s,\Psi,\omega_s)$) coupled to the drive flux angle. The pre-control functions can be found as described above in a measurement run via the direct or indirect measurement of the shaking forces, with the distinction that now not only the speed but rather also additionally the drive flux magnitude is varied. Through the described extension of the concept, a precise adaptation of the pre-control to the magnitude of the drive flux is admittedly given. The required memory capacity for the representation of the three-dimensional function however increases many times. Even if only ten supporting points are used for the representation of the dependence on the flux magnitude (which is about the minimum) then the storage requirement increases by a factor of ten (approximately 52.000 supporting values of 8 bits each). Since adequately large and cost favorable memory chips are available today this disadvantage is not too serious. The time requirement for the measurement run (which likewise increases by a factor of ten) could however speak against the above-mentioned variant for the derivation of the pre-control signals for certain applications.

Reference numeral list 1 drive winding parameter (indices)
2 control winding parameter (indices)
3 rotating field machine with a $p_1$-pole-paired drive winding and a $(p_2=p_1\pm1)$-pole-paired control winding
3a asynchronous machine with transverse force formation and torque formation 3b synchronous machine with transverse force and torque formation 4 control winding
5 drive winding
6 rotor
7 flux measurement probes
9 control apparatus
10 control current calculation
10a control current calculation with complete decoupling 10b control current calculation with partial decoupling
11 current feed apparatus for control winding
12 second means
13 flux calculation and transformation
14 drive parameters
15 first means 16a complete decoupling
16b partial decoupling
17 coordinate transformation (T→S)
d direct component (dq representation)
F transverse force vector
$F_x$ x component of the transverse force vector
$F_y$ y component of the transverse force vector
(F) drive flux orientated coordinate system example: $i_{S1q}^{(F,P_1)}$ designates the transverse components of the drive current vector in drive flux coordinates illustrated in the $p_1$ plane
$K_L$ Lorentz useful force constant: for synchronous machine $K_L=mp_1w_2/2rw_1$, for an asynchronous machine: $K_L=0$ $K_M$ Maxwell force constant: $K_M=\pi p_1 p_2 L_2/4lr\mu_0 w_1 w_2$
$K_S$ Lorentz disturbing force constant $K_S=mp_2w_1/2rw_2$ $K_{Fx}$ force constant in the x direction
$K_{Fy}$ force constant in the y direction
$K_{Sx}$ disturbing force constant in the x direction
$K_{Sy}$ disturbing force constant in the y direction
$i_{S1}^{(P_1)}$ represents the drive current vector in the $p_1$ plane
$i_{S1d}^{(P_1)}$ represents the direct component of the drive current vector in the $p_1$ plane
$i_{S1q}^{(P_1)}$ represents the transverse component of the drive current vector in the $p_1$ plane
$i_{S2}^{(P_2)}$ represents the control current vector in the $p_2$ plane
$i_{S2d}^{(P_2)}$ represents the direct component of the control current vector in the $p_2$ plane
$i_{S2q}^{(P_2)}$ represents the transverse component of the control current vector in the $p_2$ plane
l length of the rotor
$L_1$ main inductance of the drive winding
$L_2$ main inductance of the control winding
m phase number, string number
$m_g$ mass of the rotor
M torque
$M_i$ internal machine torque
$M_L$ load torque
p pole pair number
$p_1$ pole pair number of the drive winding
$p_2$ pole pair number of the control winding
($p_1$) plane of illustration with the pole pair number $p_1$
($p_2$) plane of illustration with the pole pole pair number $p_2$
q transverse component (dq representation)
R rotor
r radius of rotor
S stator
(S) stator orientated coordinate system for example: $i_{S2}^{(S,P_2)}$ designates the control current vector in stator coordinates illustrated in the $p_1$ plane (T) coordinate system rotating with the angle ρ for example: $i_{S2}^{(T,P_2)}$ designates the control current vector in a coordinate system rotating with the angle $\rho^{(P_2)}$ illustrated in the $p_1$ plane $w_1$ winding number of the drive winding
$w_2$ winding number of the control winding
X,Y axes of the geometrical coordinate system (indices)
x,y deflection of the rotor in the x,y direction
* desired values, control values example: $i_{S2}^{*(S,P_2)}$ designates the desired value of the control current vector in stator coordinates illustrated in the $p_1$ plane
$\alpha_0$ mutual rotation of the d axis of the drive winding relative to the x-axis of the geometrical coordinate system
$\alpha_{1,2}$ mutual rotation of the d axes of the drive and control windings $\gamma_m$ mechanical rotor angle
$\gamma_s^{(P_1)}$ argument of the drive flux vector illustrated in the $p_1$ plane
$\mu_o$ magnetic field constant in vacuum
π circuit constant
$\psi_1$ drive flux value $\psi_1^{(P_1)}$ drive flux vector illustrated in the $p_1$ plane
$\rho^{(P_2)}$ mutual rotation of the coordinate system (T) used to calculate the desired control current vector relative to the stator coordinate system measured in the $p_2$ plane
$\rho_0^{(P_2)}$ time invariable component of $\rho^{(P_2)}$
$\omega_m$ mechanical frequency of rotation
$\omega_R$ rotor frequency of rotation (slip frequency)

' pre-control parameters, compensation parameters for example: $i_{S2}'^{(S,P_2)}$ designates the pre-control current vector in stator coordinates represented in the $p_2$ plane " pre-control parameters coupled to the mechanical rotor angle for example: $i_{S2}''^{(S,P_2)}(\gamma_m,\omega_m)$ designates the pre-control current vector in stator coordinates coupled to the mechanical rotor angle represented in the $p_2$ plane ''' pre-control parameters coupled to the drive flux angle for example: $i_{S2}'''^{(S,P_2)}(\gamma_s,\omega_s)$ designates the pre-control current vector in stator coordinates coupled to the drive flux angle represented in the $p_2$ plane
F' pre-control force vector
$F_x'$ x component of the pre-control current vector
$F_y'$ y component of the pre-control current vector
F" component of the pre-control force vector coupled to the mechanical rotor angle
$F_x''$ x component of the component of the part of the pre-control force vector coupled to the mechanical rotor angle
$F_y''$ y component of the part of the pre-control force vector coupled to the mechanical rotor angle
F''' part of the pre-control force vector coupled to the drive flux angle
$F_x'''$ x component of the part of the pre-control force vector coupled to the drive flux angle
$F_y'''$ y component of the part of the pre-control force vector coupled to the drive flux angle
f(a,b) function of a and b for example: $F_x'=f(\gamma_m,\omega_m)$ means $F_x'$ is a function of the parameters $\gamma_m$ and $\omega_m$ $i_{S2}'^{(P_2)}$ pre-control current vector (pre-control of the stator current of the control winding ($S_2$) with the pole pair number $p_2$ $i_{S2d}'^{(P_2)}$ direct component of the pre-control current vector $i_{S2q}'^{(P_2)}$ transverse component of the pre-control current vector $i_{S2}''^{(P_2)}$ part of the pre-control current vector coupled to the mechanical rotor angle (without recitation of the reference coordinate system)

$i_{S2d}''^{(P_2)}$ direct component of the part of the pre-control current vector coupled to the mechanical rotor angle (without recitation of the reference coordinate system)

$i_{S2q}''^{(P_2)}$ transverse component of the part of the pre-control current vector coupled to the mechanical rotor angle (without recitation of the reference coordinate system)

$i_{S2}^{'''(P2)}$ part of the pre-control current vector coupled to the drive flux angle (without recitation of the reference coordinate system)

$i_{S2d}^{'''(P2)}$ direct component of the part of the pre-control current vector coupled to the drive flux angle (without recitation of the reference coordinate system)

$i_{S2q}^{'''(P2)}$ transverse component of the part of the pre-control current vector coupled to the drive flux angle (without recitation of the reference coordinate system)

$\gamma_m$ mechanical rotor angle
$\gamma_s$ argument of the drive flux vector (without recitation of the reference system)
$\psi_1$ magnitude of the drive flux
$\omega_m$ mechanical angular frequency of the rotor (identical to the mechanical frequency of rotation)
$\omega_s$ angular frequency of the drive flux

What is claimed is:

1. A method for compensation of periodic shaking forces in an AC-machine having a rotor and a stator that includes a stator winding for combined generation of a torque and a transverse force F which acts perpendicular to the rotor and whose magnitude and direction can be adjusted as desired, the stator winding including a drive winding with a pole pair number $p_1$ and a control winding with a pole pair number $p_2$ that is defined by $$p_2 = p_1 \pm 1,$$

wherein
the drive winding of the stator winding is supplied with a drive current $i_{S1}$ for generating a drive flux which can be represented in an electrical $p_1$-plane by its magnitude and its argument, the $p_1$-plane being associated with the pole pair number $p_1$ of the drive winding, and
the control winding of the stator winding is supplied with a control current $i_{S2}$ independently of the drive current $i_{S1}$, which control current $i_{S2}$ generates a control flux which can be represented in an electrical $p_2$-plane by its magnitude and its argument, the $p_2$-plane being associated with the pole pair number $p_2$ of the control winding, wherein
a method of controlling the AC machine comprises the steps of
a) determining the argument $\gamma_s^{(p1)}$ of the drive flux in the $p_1$-plane,
b) determining, in a coordinate system (T) that is rotating with an angle that corresponds to said argument $\gamma_s^{(p1)}$ of the drive flux, the control current $i_{S2}^{*(T,p2)}$ in the $p_2$-plane necessary for a desired transverse force $\underline{F}^*$,
c) transforming said control current $i_{S2}^{*(T,p2)}$ by a coordinate rotation about a rotation angle $p^{(p2)}$ into a coordinate system (S) fixed to the stator, said rotation angle being defined by $p^{(p2)} = p_o^{(p2)} + \gamma_s^{(p1)}$ wherein $p_o^{(p2)}$ denotes a constant angle describing a given relative rotation between the control winding and the drive winding in the stator,
the method for compensation comprising compensating shaking forces that act on the rotor, and that are periodically linked with the geometrical drive flux angle or the mechanical rotor angle, by a pre-control of the desired value of at least one of a transverse force, a control current dependent on the drive flux, an angular speed of the drive flux, a mechanical rotor angle, and a mechanical angular speed of the rotor.

2. A method in accordance with claim 1, wherein the compensation takes place by adding a pre-control force $$\underline{F}' = \begin{pmatrix} F_x' \\ F_y' \end{pmatrix}$$

with the vector components $F_x' = f(\gamma_m, \omega_m)$ and $F_y' = f(\gamma_m, \omega_m)$ dependent on the mechanical rotor angle and on the angular speed of the rotor to the components $F_x^*$ and $F_y^*$ of the desired force value $\underline{F}^*$ in the AC-machine.

3. A method in accordance with claim 1, wherein
the compensation takes place in the AC-machine, by a pre-control force $$\underline{F}''' = \begin{pmatrix} F_x''' \\ F_y''' \end{pmatrix},$$

the vector components $F_x''' = f(\gamma_s, \omega_s)$ and $F_y''' = f(\gamma_s, \omega_s)$ being dependent on the geometrical drive flux angle and on the angular speed of the drive flux, and
by a pre-control force $$\underline{F}'' = \begin{pmatrix} F_x'' \\ F_y'' \end{pmatrix},$$

the vector components $F_x'' = f(\gamma_m, \omega_m)$ and $F_y'' = f(\gamma_m, \omega_m)$ being dependent on the mechanical rotor angle and on the angular speed of the rotor, $F'''$ and $F''$ being added to the components $F_x^*$ and $F_y^*$ of the desired force value $\underline{F}^*$.

4. A method in accordance with claim 2, further comprising
determining the shaking force acting on the rotor in a measurement run for various speeds of rotation in dependence on the mechanical rotor angle and averaging and storing over several periods of the mechanical rotor angle as a function table in dependence on the rotor position and on the speed of rotation, and
subsequently during operation, reading out values of the function table in dependence on the mechanical rotor angle and on the mechanical speed of rotation, the so-obtained force being added after a change of the sign to the desired force value $\underline{F}^*$ with the components $F_x^*$ and $F_y^*$ as a pre-control force $$\underline{F}' = \begin{pmatrix} F_x' \\ F_y' \end{pmatrix}$$

with the vector components $F_x' = f(\gamma_m, \omega_m)$ and $F_y' = f(\gamma_m, \omega_m)$.

5. A method in accordance with claim 3, further comprising
determining the shaking force acting on the rotor in a measurement run for various angular speeds of the drive flux in dependence on the drive flux angle by technical measurement and averaging and storing over very many periods of the geometrical drive flux angle, and after a change in sign, as a function table in dependence on the geometrical drive flux angle and the angular speed of the drive flux as a pre-control force $$\underline{F}''' = \begin{pmatrix} F_x''' \\ F_y''' \end{pmatrix}$$

with the vector components $F_x'''=f(\gamma_s,\omega_s)$ and $F_y'''=f(\gamma_s,\omega_s)$, during the same measurement run, determining the shaking force acting on the rotor for various angular speeds of the rotor in dependence on the rotor angle and averaging over very many periods of the rotor angle and storing, after a change of sign, as a function table in dependence on the rotor angle and the angular speed of the rotor as a pre-control force $$\underline{F}'' = \begin{pmatrix} F_x'' \\ F_y'' \end{pmatrix}$$

with the vector components $F_x''=f(\gamma_m,\omega_m)$ and $F_y''=f(\gamma_m,\omega_m)$, and whereafter, during operation, reading out the values of the function table in dependence on the mechanical rotor angle, on the geometrical drive flux angle, on the mechanical speed of rotation and on the angular speed of the drive flux, the so obtained pre-control forces $\underline{F}'''$ and $\underline{F}''$ being added to the desired force value $\underline{F}^*$.

6. A method in accordance with claim 2, further comprising superimposing a transverse force regulating system or a position regulating system with an integral component on the machine, storing, during a measurement run, at very low angular speed of the drive flux, the regulator signals in a table as a function of the geometrical drive flux angle for one rotation or averaged over several rotations, and, in operation, subsequently reading out again the table values in dependence on the geometrical drive flux angle and adding the table values as a pre-control force $\underline{F}'''$ to the desired force value $\underline{F}^*$.

7. A method in accordance with claim 1, further comprising compensating the shaking forces acting on the rotor of the AC-machine with a pre-control current $$\underline{i}_{S2}^{(T_2P_2)} = \begin{pmatrix} i_{S2d}^{(T_2P_2)} \\ i_{S2q}^{(T_2P_2)} \end{pmatrix}$$

dependent on the mechanical rotor angle and on the angular speed of the rotor, the vector components $i_{S2d}'^{(T_2P_2)}=f(\gamma_m,\omega_m)$ and $i_{S2q}'^{(T_2P_2)}=f(\gamma_m,\omega_m)$ being added to the control current $$\underline{i}_{S2}^{*(T_2P_2)} = \begin{pmatrix} i_{S2d}^{*(T_2P_2)} \\ i_{S2q}^{*(T_2P_2)} \end{pmatrix}$$

8. A method in accordance with claim 1, wherein the shaking forces acting on the rotor of the AC-machine are compensated by adding to the control current $$\underline{i}_{S2}^{*(T_2P_2)} = \begin{pmatrix} i_{S2d}^{*(T_2P_2)} \\ i_{S2q}^{*(T_2P_2)} \end{pmatrix}$$

a pre-control current $$\underline{i}_{S2}^{''(T_2P_2)} = \begin{pmatrix} i_{S2d}^{''(T_2P_2)} \\ i_{S2q}^{''(T_2P_2)} \end{pmatrix}$$

with the vector components $i_{S2d}''^{(T_2P_2)}=f(\gamma_m,\omega_m)$ and $i_{S2q}''^{(T_2P_2)}=f(\gamma_m,\omega_m)$ dependent on the mechanical rotor angle and on the angular speed of the rotor in order to compensate the periodic shaking forces which are linked to the mechanical rotor angle and which act on the rotor, and then adding a pre-control current $$\underline{i}_{S2}^{'''(T_2P_2)} = \begin{pmatrix} i_{S2d}^{'''(T_2P_2)} \\ i_{S2q}^{'''(T_2P_2)} \end{pmatrix}$$

with the vector components $i_{S2q}'''^{(T_2P_2)}=f(\gamma_s,\omega_s)$ and $i_{S2d}'''^{(T_2P_2)}=f(\gamma_s,\omega_s)$ dependent on the geometrical drive flux angle and on the angular speed of the drive flux in order to compensate periodic shaking forces acting on the rotor which are linked with the geometrical drive flux angle.

9. A method in accordance with claim 7, wherein one of the vector components $i_{S2d}'^{(T_2P_2)}=f(\gamma_m,\omega_m)$ and $i_{S2q}'^{(T_2P_2)}=f(\gamma_m,\omega_m)$ of the pre-control current $$\underline{i}_{S2}^{'(T_2P_2)} = \begin{pmatrix} i_{S2d}^{'(T_2P_2)} \\ i_{S2q}^{'(T_2P_2)} \end{pmatrix}$$

or the vector components $i_{S2d}''^{(T_2P_2)}=f(\gamma_m,\omega_m)$ and $i_{S2q}''^{(T_2P_2)}=f(\gamma_m,\omega_m)$ of the pre-control current $$\underline{i}_{S2}^{''(T_2P_2)} = \begin{pmatrix} i_{S2d}^{''(T_2P_2)} \\ i_{S2q}^{''(T_2P_2)} \end{pmatrix},$$

and the vector components $i_{S2d}'''^{(T_2P_2)}=f(\gamma_s,\omega_s)$ and $i_{S2q}'''^{(T_2P_2)}=f(\gamma_s,\omega_s)$ of the pre-control current $$\underline{i}_{S2}^{'''(T_2P_2)} = \begin{pmatrix} i_{S2d}^{'''(T_2P_2)} \\ i_{S2q}^{'''(T_2P_2)} \end{pmatrix},$$

are stored in table form in a semiconductor memory as two-dimensional functions represented by supporting values, and wherein during operation, the pre-control currents $\underline{i}_{S2}'^{(T_2P_2)}$ or $\underline{i}_{S2}''^{(T_2P_2)}$ and $\underline{i}_{S2}'''^{(T_2P_2)}$ are read out from the table in dependence on one of the geometrical drive flux angle and the angular speed of the drive flux, or on the mechanical rotor angle and on the angular speed of the mechanical rotor, and are added to the control current $$\underline{i}_{S2}^{*(T_2P_2)} = \begin{pmatrix} i_{S2d}^{*(T_2P_2)} \\ i_{S2q}^{*(T_2P_2)} \end{pmatrix}$$

10. A method in accordance with claim 7, wherein in the AC-machine, the shaking force acting on the rotor is determined in a measurement run for various speeds of rotation in dependence on the mechanical rotor angle and is stored as a function table averaged over several periods of the mechanical rotor angle in dependence on the rotor position and on the speed of rotation, and wherein, during operation, the pre-control current $$\underline{i}_{S2}^{(T,P2)} = \begin{pmatrix} i_{S2d}^{(T,P2)} \\ i_{S2q}^{(T,P2)} \end{pmatrix}$$

is subsequently so computed from this step so that it brings about a compensation force opposed to the shaking force.

11. A method in accordance with claim 7, wherein in the AC-machine, the shaking force acting on the rotor is determined in a measurement run for various angular speeds of the drive flux in dependence on the geometrical drive flux angle and is averaged over very many periods of the drive flux angle and then stored as a function table in dependence on the geometrical drive flux angle and on the angular speed of the drive flux, in the same measurement run, for various angular speeds of the rotor, the shaking force acting on the rotor is determined in dependence on the mechanical rotor angle and averaged over very many periods of the rotor angle and stored as a function table in dependence on the rotor angle and on the angular speed of the rotor, during operation the pre-control current $$\underline{i}_{S2}^{m(T,P2)} = \begin{pmatrix} i_{S2d}^{m(T,P2)} \\ i_{S2q}^{m(T,P2)} \end{pmatrix}$$

linked to the drive flux angle is so determined from the two function tables by interpolation between the supporting values and by change of the sign that it brings about a compensation force opposed to the component of the shaking force associated with the machine flux, and the pre-control current $$\underline{i}_{S2}^{m(T,P2)} = \begin{pmatrix} i_{S2d}^{m(T,P2)} \\ i_{S2q}^{m(T,P2)} \end{pmatrix}$$

linked with the mechanical rotor angle is so determined that it brings about a compensation force opposed to the component of the shaking force associated with the mechanical rotor angle.

12. A method in accordance with claim 7, wherein the correction measures set forth are not carried out in the coordinate system (T) rotating with the angle $\gamma_s^{(P1)}$ but rather in the coordinate system (S) fixed relative to the stator.

13. A method in accordance with claim 1, wherein in determining the pre-control signals, the dependence of the shaking forces on the magnitude of the drive flux ($\psi$) is additionally taken into account.

* * * * *